(12) United States Patent
Alexander et al.

(10) Patent No.: US 12,108,243 B2
(45) Date of Patent: Oct. 1, 2024

(54) SELECTIVE PRIVACY FILTERING FOR ONLINE CONFERENCES

(71) Applicant: Cisco Technology, Inc., San Jose, CA (US)

(72) Inventors: William Sterling Alexander, Durham, NC (US); Joshua Austin Knestaut, Durham, NC (US); Jerome Henry, Pittsboro, NC (US); Maik Guenter Seewald, Steigerwaldstrasse (DE); Robert Edgar Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 657 days.

(21) Appl. No.: 17/244,114

(22) Filed: Apr. 29, 2021

(65) Prior Publication Data
US 2022/0350925 A1    Nov. 3, 2022

(51) Int. Cl.
*H04W 12/02*    (2009.01)
*G06T 5/70*    (2024.01)
*G06T 11/20*    (2006.01)
*G06V 40/16*    (2022.01)

(52) U.S. Cl.
CPC ............... *H04W 12/02* (2013.01); *G06T 5/70* (2024.01); *G06T 11/20* (2013.01); *G06V 40/166* (2022.01)

(58) Field of Classification Search
None
See application file for complete search history.

(56) References Cited

U.S. PATENT DOCUMENTS

| | | | |
|---|---|---|---|
| 9,888,211 B1 | 2/2018 | Browne et al. | |
| 2007/0206759 A1* | 9/2007 | Boyanovsky | H04M 3/42221 |
| | | | 379/202.01 |
| 2008/0259154 A1 | 10/2008 | Garrison et al. | |
| 2013/0194375 A1 | 8/2013 | Michrowski et al. | |

(Continued)

FOREIGN PATENT DOCUMENTS

| | | |
|---|---|---|
| CN | 104584539 A | 4/2015 |
| JP | 6027243 B2 | 11/2016 |
| KR | 20100116661 A | 11/2010 |

OTHER PUBLICATIONS

Rajamanickam Antonimuthu, "Google develops Audio-Visual model for isolating Single Voice in Crowd", Youtube, Apr. 13, 2018, 7 pages.

(Continued)

*Primary Examiner* — Nelson S. Giddins
(74) *Attorney, Agent, or Firm* — Edell, Shapiro & Finnan, LLC

(57) ABSTRACT

Methods are provided in which a user device connects a participant to a collaboration session in which the participant communicates with at least one other participant using audio and/or video, which is distributed in a media stream to the at least one other participant via a respective user device. In these methods, the user device detects at least one of an object within a space that is included in the video and an audio signal and selectively filters the media stream to exclude the object or a portion of the audio signal based on at least one of participant list information, learned background information, or learned voices of participants of the collaboration session.

20 Claims, 6 Drawing Sheets

(56) References Cited

U.S. PATENT DOCUMENTS

| | | | | |
|---|---|---|---|---|
| 2013/0321403 | A1* | 12/2013 | Piemonte | G01C 21/3638 |
| | | | | 345/419 |
| 2014/0362163 | A1* | 12/2014 | Winterstein | H04N 7/15 |
| | | | | 348/14.07 |
| 2016/0155009 | A1* | 6/2016 | Han | H04N 23/635 |
| | | | | 382/173 |
| 2016/0173821 | A1* | 6/2016 | De Magalhaes | H04N 23/61 |
| | | | | 348/14.08 |
| 2017/0148487 | A1 | 5/2017 | Krishnakumar et al. | |
| 2018/0365809 | A1* | 12/2018 | Cutler | H04N 7/15 |
| 2022/0053147 | A1* | 2/2022 | Kawano | G06T 11/00 |

OTHER PUBLICATIONS

Shutterstock, "Work from home in style with FREE virtual backgrounds", retrieved from Internet Apr. 27, 2021, 20 pages; https://www.shutterstock.com/discover/free-virtual-backgrounds.

Aisha Ja, "Person With Custom Zoombackground is Clearly Hidingsomething, but What?", The Eye Opener, Sep. 17, 2020, 10 pages.

Mike Bahtiarian, "6 tips to improve your home acoustics while holding video meetings", Fast Company, May 22, 2020, 4 pages.

Fang, M., "Method of Passive Participant Tracking Video Conference," Technical Disclosure Commons, https://www.tdcommons.org/dpubs_series/1809, Dec. 21, 2018, 11 pages.

Chen, B., "Changing an Online Video Meeting Background in Real-Time Using Deep Learning," Technical Disclosure Commons, https://www.tdcommons.org/dpubs_series/2898, Jan. 27, 2020, 6 pages.

* cited by examiner

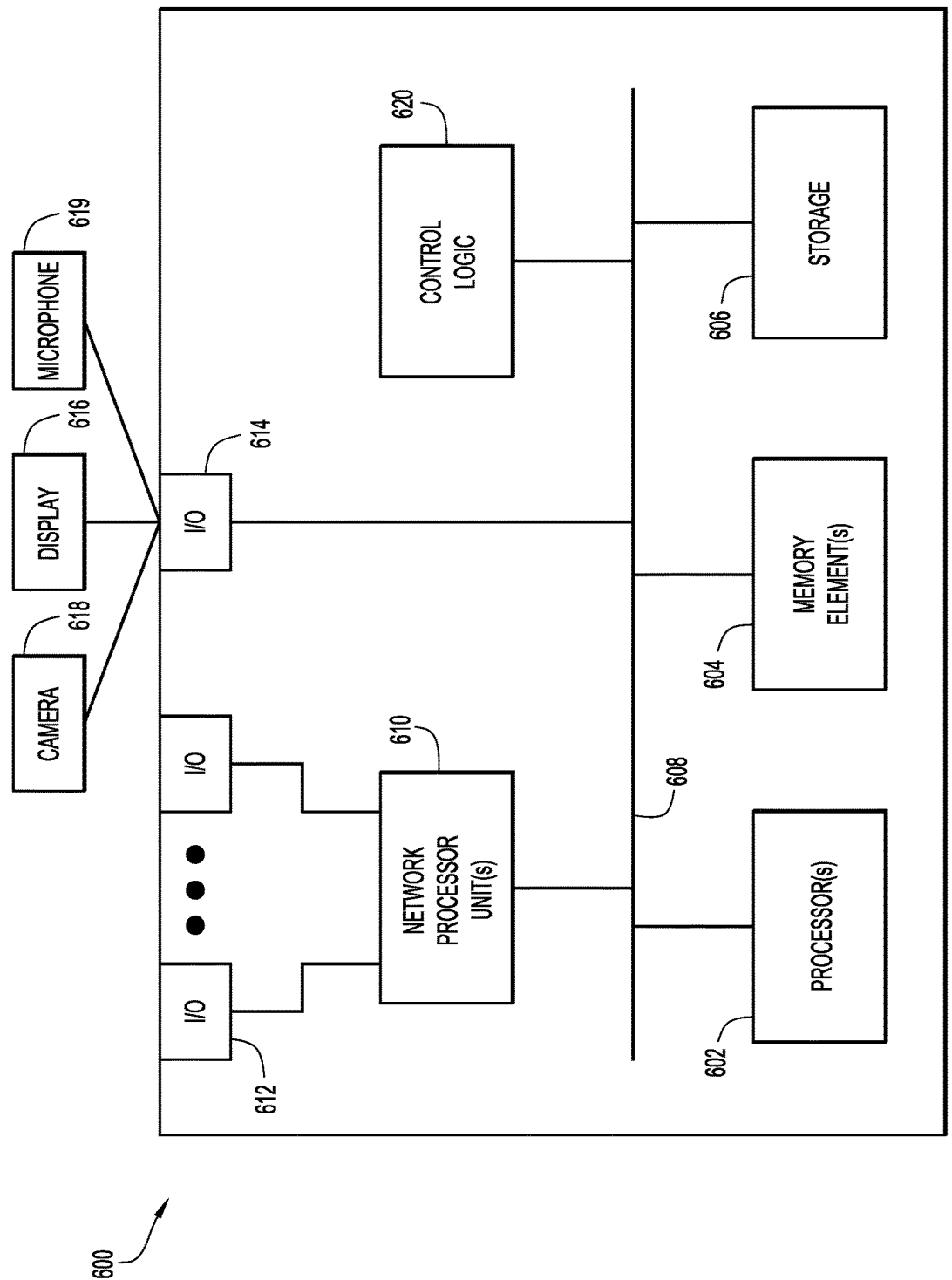

SELECTIVE PRIVACY FILTERING FOR ONLINE CONFERENCES

TECHNICAL FIELD

The present disclosure relates to online meeting space environments.

BACKGROUND

Virtual meeting space environments allow for online collaboration. Online collaboration typically involves a group of geographically remote participants joining an online meeting via respective devices. To facilitate immersive exchanges and mimic real world meeting space environment, cameras and laptop omnidirectional or cardioid microphones are commonly used. These audio and video tools, however, often present privacy violation risks as they may capture other people without their consent, unwanted noises, cluttered backgrounds behind meeting participants, and/or private items of the participant.

BRIEF DESCRIPTION OF THE DRAWINGS

FIG. 6 is a hardware block diagram of a computing device that may perform functions associated with any combination of operations in connection with the techniques depicted and described in FIGS. 1-5, according to various example embodiments.

DESCRIPTION OF EXAMPLE EMBODIMENTS

Overview

Briefly, systems and methods are provided that provide an enhanced privacy preserving filtering of audio or video during a collaboration session. These methods involve a user device connecting a participant to a collaboration session in which the participant communicates with at least one other participant using audio and/or video, which is distributed in a media stream to the at least one other participant via a respective user device. These methods further involve the user device detecting at least one of an object within a space that is included in the video and an audio signal, and selectively filtering the media stream to exclude the object or a portion of the audio signal based on at least one of participant list information, learned background information, or learned voices of participants of the collaboration session.

Example Embodiments

In an online meeting space environment, participants and/or users (these terms are used interchangeably throughout the description) are participating via their respective devices that may be geographically remote from each other. The participant and the respective user (client) device, such as a computer, laptop, tablet, smart phone, etc., may collectively be referred to as endpoints, user devices, or devices. The devices may communicate with each other via one or more networks such as the Internet.

Some of the devices may have video capabilities in a collaboration session. Video capabilities may include, but are not limited to, live feed of a respective participant on a user interface screen. Other devices may not have video capabilities in the collaboration session and may only have audio capabilities. Further, some of the devices may have interactive connectivity to manipulate content on the user interface screen and other devices may have view-only capability to be able only to view content during the collaboration session. These are just some examples and are not provided by way of a limitation.

Figure 1:
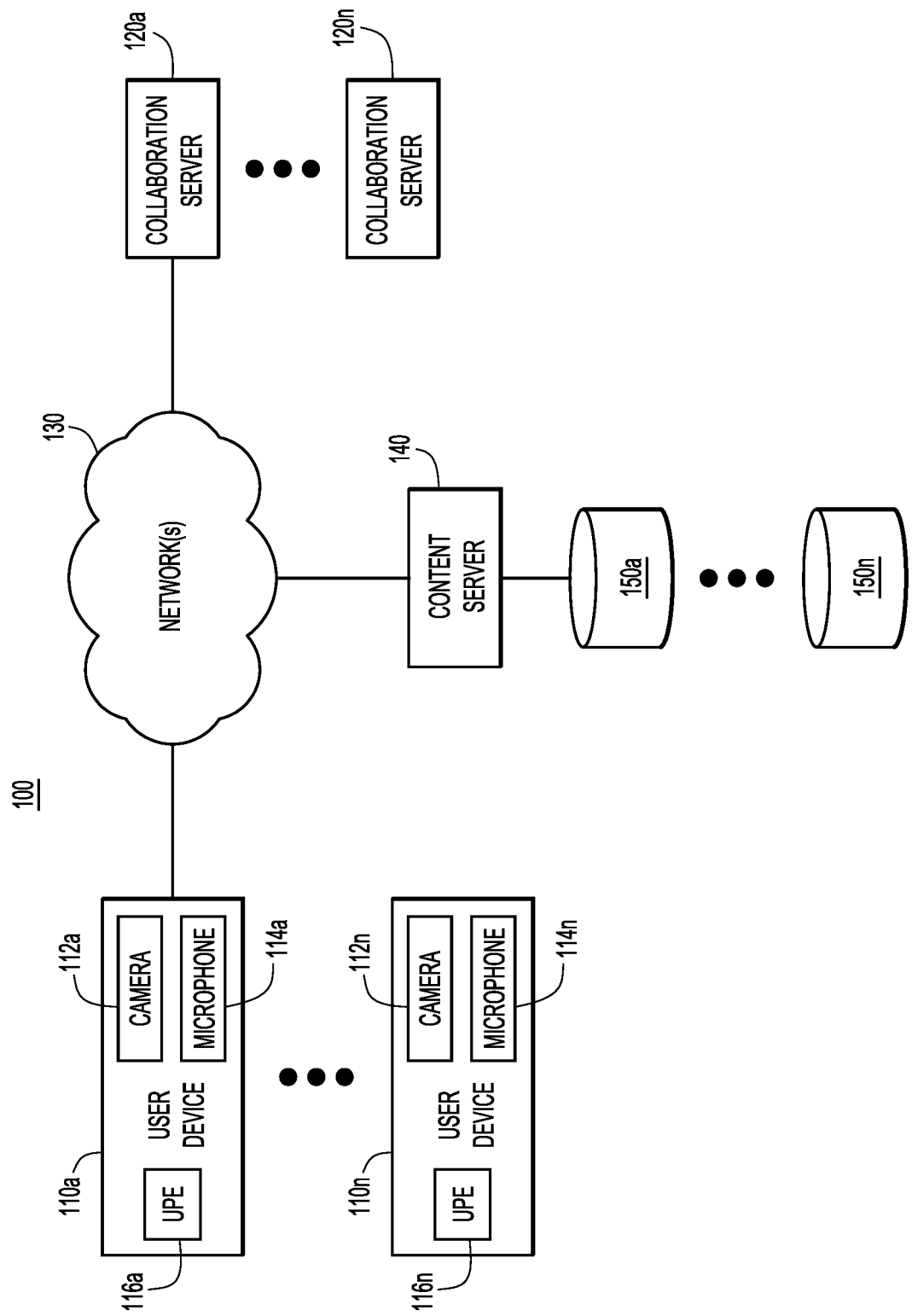
FIG. 1 is a block diagram illustrating a system configured to provide a collaboration session among a plurality of participants, according to an example embodiment

FIG. 1 is a block diagram illustrating a system 100 configured to provide a collaboration session among a plurality of participants, according to an example embodiment. The system 100 includes a plurality of user devices (devices) 110a-n, a plurality of collaboration servers 120a-n, a network or a collection of networks (network(s) 130), and a content server 140 having one or more associated databases 150a-n. The notation "a-n" denotes that a number is not limited, can vary widely, and depends on a particular use case scenario.

In the system 100, one or more users may be participating in a collaboration session using their respective devices 110a-n. The collaboration session is managed and/or controlled by the collaboration servers 120a-n. The devices 110a-n communicate with the collaboration servers 120a-n via the network(s) 130.

The network(s) 130 may include a wide area network (WAN) such as the Internet, one or more local area networks (LANs), or a combination thereof, and includes wired, wireless, or fiber optic connections. In general, the network(s) 130 can use any combination of connections and protocols that support communications between the entities of the system 100.

The devices 110a-n may obtain a session identifier and/or an identifier of content, such as a document, corresponding to the session by communicating with the collaboration servers 120a-n. Based on an identifier of the content obtained from the collaboration servers 120a-n, the devices 110a-n may then communicate with the content server 140 to obtain the content/document itself that is stored in one or more databases 150a-n.

Devices 110a-n may include one or more cameras 112a-n, respectively, and microphones 114a-n, respectively. For example, the device 110a includes a camera 112a to capture live video of the respective user and a microphone 114a to capture audio from the respective user. The live video feed and audio collectively form a multimedia stream of a collaboration session. The live video feed has a plurality of consecutive frames.

The devices 110a-n may further include user privacy engines (UPEs) 116a-n, respectively. The UPEs 116a-n are configured to learn the environment of a collaboration session for the respective participant and selectively filter person(s), object(s), and/or audio from the multimedia stream of the collaboration session.

The captured and filtered multimedia stream is then provided to the collaboration servers 120a-n, which then distribute the filtered multimedia stream to the other user devices of the remaining participants of the collaboration session.

The collaboration servers 120a-n store identifiers of various collaboration sessions and identifiers of corresponding content (documents) that may be obtained from the databases 150a-n (one or more memories) via the content server 140. For security purposes and to avoid data leakage, the content server 140 does not have decryption capability with respect to the content (documents). The content server 140 controls the storing of the content in an encrypted format. In addition, the content server 140 controls retrieval of the encrypted content for a respective collaboration session and communicates the retrieved content in its encrypted form to the requesting device e.g., via the collaboration servers 120a-n. The devices 110a-n decrypt the received data and encrypt data prior to communicating with the other devices in the collaboration session.

The collaboration servers 120a-n are configured to communicate with various client applications executing on the devices 110a-n. The client applications running on the devices 110a-n detect various actions performed by the respective participants during a collaboration session and notify the respective collaboration server associated with the collaboration session about these events. Further, the client applications, via the respective cameras 112a-n and/or the respective microphones 114a-n, capture audio and/or live video feed of the respective participants and provide the captured multimedia stream to the collaboration servers 120a-n. The collaboration servers distribute for rendering or displaying, on a user interface screen of the respective device, the multimedia stream that may include one or more content of the collaboration session. The collaboration server also sends commands to the client applications running on the devices 110a-n to render the multimedia stream in a particular way, to change views, controls, and so on.

The collaboration servers 120a-n control the collaboration sessions by communicating and/or interacting with client applications running on the devices 110a-n that detect various actions performed by the participants during the collaboration sessions and execute commands and/or instructions for the collaboration sessions as provided by the collaboration servers 120a-n.

Collaboration session applications facilitate immersive interaction between various remote participants with the use of cameras 112a-n and microphones 114a-n. However, these tools often present privacy risks. For example, when people work from home, family members or visiting friends may pass through the field of the collaboration space or speak without knowing that they are being seen and/or heard. Similarly, when working from public places, complete strangers can be heard and/or seen. Although some laws may authorize capturing images of people in public spaces without the need for their consent, many laws prohibit recording their audio without their consent. Further, capturing images and/or sound of people in private spaces without their consent may be illegal even if the person is a family member.

Additionally, some participants do not turn on their cameras and/or mute their microphones in public settings or at home when they have family members nearby, for fear of being interrupted, exposing their family members to colleagues' scrutiny, or simply because of the uncomfortable impression that lack of control over the possibility of a third party in the field and/or the audio feed causes. Thus, there is a need for techniques that facilitate privacy (that of the participant of a teleconference, and that of the environment in a video conference). The participant needs to control what images/video/audio is to be shared.

The system 100 is configured to selectively apply privacy filtering for various collaboration sessions using the UPEs 116a-n. The privacy filtering involves audio and/or video filtering of the media stream. The UPEs 116a-n are configured to filter out audio and/or video corresponding to selected (blacklisted) persons (not intended participants of the collaboration session) or to filter out all audio and/or video other than from selected (whitelisted) persons (participants of the collaboration session). The video filtering may include, for example, selective blurring of items and/or individuals other than the intended participant(s) or replacing them based on learned information about the user's background.

In one example embodiment, the media stream captured at a respective user device (device 110a) is filtered prior to being transmitted to one of the collaboration servers 120a-n. In another example embodiment, the UPEs 116a-n are assisted by the collaboration servers 120a-n to perform the selective filtering e.g., some of the processing may be performed at the collaboration servers 120a-n. In yet another example embodiment, the captured media stream may be provided to the collaboration servers 120a-n for performing selective filtering. The computing device that performs the selective filtering may depend on a particular deployment of the system 100 and use case scenario.

Selective Filtering of Inadvertent Person(s)

Many collaboration sessions and meetings occur at home. This creates challenges because a family member may inadvertently walk into a room or be walking in the background of a larger open space assuming the participant is outside of the collaboration space. This can cause embarrassing situations for both the meeting participant and the unwanted "inadvertent participant". While background blurring may be used to hide a messy room, it may reveal inadvertent participants and moving objects. It may still result in unintended appearances of a passersby while he assumes that he is hidden by the virtual background. Further, virtual backgrounds are increasingly seen as an indication that the participant has something to hide.

In one or more example embodiments, an initial participant (or group of participants) is marked or detected at the start of the collaboration session and are then tracked during the collaboration session. Using an image segmentation model, these participants are detected and then confirmed, as primary participants, using facial recognition techniques and meeting information. When a new person enters the video and is detected by the image segmentation model, that person is tracked as a new participant and automatically blurred, as he is not identified as the primary participant (unless identified by the facial recognition and meeting information as being an invited participant to the meeting). Of course, the primary participant of the respective user device may select if they would like to un-blur the new participant (in case this new participant should be shown in the video feed) or can simply keep them blurred (in the case of the inadvertent participant who should remain hidden).

Figure 2:
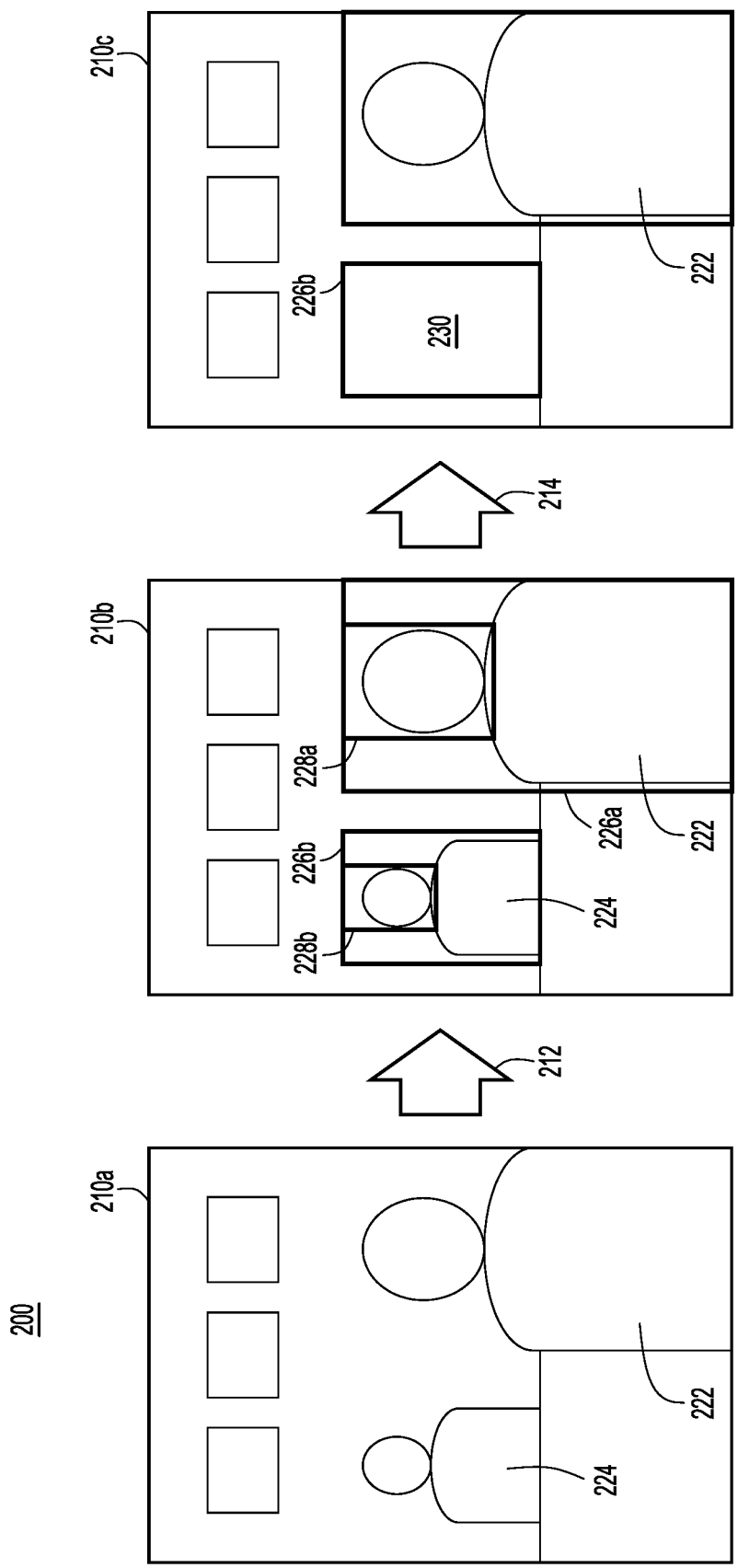
FIG. 2 is a diagram depicting a method for selectively filtering a person from a media stream of a collaboration session, according to an example embodiment.

Reference in now made to FIG. 2, with continued reference to FIG. 1. FIG. 2 is a diagram depicting a method 200 for selectively filtering a person from a media stream of a collaboration session, according to an example embodiment. The method 200 may be performed by one of the UPEs 116a-n of FIG. 1.

The method 200 includes a first participant 222 (Bob) connecting to a collaboration session using his respective user device (e.g., device 110a). The first participant 222 connects to the collaboration session using the and the microphone of his user device. Thus, the media stream from the first participant includes live video feed. The media stream may include one or more image frames such as the image frame 210a and audio.

At 212, the method 200 involves the UPE 116a executing a segmentation technique in which the presence of people in the live video feed (the image frame 210a) is detected. Specifically, the first participant 222 and a second participant 224 are detected, as shown in a frame 210b. The UPE 116a then calculates boundaries around the detected first participant 222 (a first boundary box 226a) and second participant 224 (a second boundary box 226b), respectively, and performs a facial recognition process to detect the first face 228a of the first participant 222 and the second face 228b of the second participant 224. Each of the first face 228a and the second face 228b is compared with facial information of the primary meeting participants for the meeting, which is available in the meeting information, to determine if the respective participant is a primary or intended participant of the collaboration session. Meeting information includes a user profile for each participant of the collaboration session. The user profile includes an image or a thumbnail of the participant's face. The meeting information may be obtained, by a collaboration server and/or the UPE 116a, from a third party service. For example, the meeting information may be obtained from a calendar application and/or a calendar server, which manages participant's daily schedule.

At 214, the method 200 involves the UPE 116a determining that the first participant 222 is a primary participant of the collaboration session and should remain in the media stream, whereas the second participant 224 is not a primary participant. The second participant 224 is determined to be an inadvertent participant because she is not found in the meeting list or meeting roster. That is, the facial characteristics of the second participant 224 do not match any of the facial characteristics data stored in the meeting information. The UPE 116a then selectively filters the media stream to produce frames such as a frame 210c. In the frame 210c, the second boundary box 226b is marked for blurring or background replacement. For example, blurring may be performed using Gaussian blur, or otherwise made opaque, hiding the second participant 224. In the frame 210c, the second boundary box 226b becomes an opaque inside (a section 230).

In one example embodiment, when the background replacement is enabled, the second participant 224 remains hidden as part of the background. That is, the second boundary box 226b is marked as hidden, with current background replacement covering the space inside the second boundary box 226b. When the background blur or replacement is not enabled, the second boundary box 226b is used to blur the section 230 of the screen occupied by the second participant 224 (image inside the second boundary box 226b). For example, existing background blurring features are used in reverse i.e., by blurring the section 230 (inadvertent participant occupied space) of the frame 210c rather than the space around the participant(s).

Optionally, the first participant 222 may select to include the second participant 224 as part of the collaboration session. Based on this selection, the selective filtering is stopped and the media stream that includes the image frame 210a (instead of the frame 210c) is provided for distribution to other ones of the devices 110a-n.

Selective Audio/Video Filtering of Background

In most settings, participants of a collaboration session may use a small set of devices among the devices 110a-n such as their phone, their personal or company-provided laptop. Accordingly, the UPEs on that participant's devices are configured to learn characteristics regarding the respective participants (their voice) and their background or respective spaces of the collaboration session.

Existing solutions, such as various recognition engines and noise cancellation techniques, that are trained using non-human sounds, are rather limiting and resource intensive. Existing recognition engines may blur the virtual background but cannot distinguish various objects that should or should not appear in the virtual background. Further, existing noise cancellation techniques are process-intensive in that each sound needs to be compared against a possible large database of non-human sounds. These noise cancellation techniques are also process-expensive because they require memory resources to store all the various sounds, and any unusual sounds or patterns not stored will not be treated as noise. These noise cancellation techniques do not adapt to new and/or untrained background sounds.

In one or more example embodiments, the UPEs 116a-n of FIG. 1 are configured to augment the efficiency of incoming audio and video processing for a collaboration application using learned characteristics about the participant and/or their background.

Figure 3:
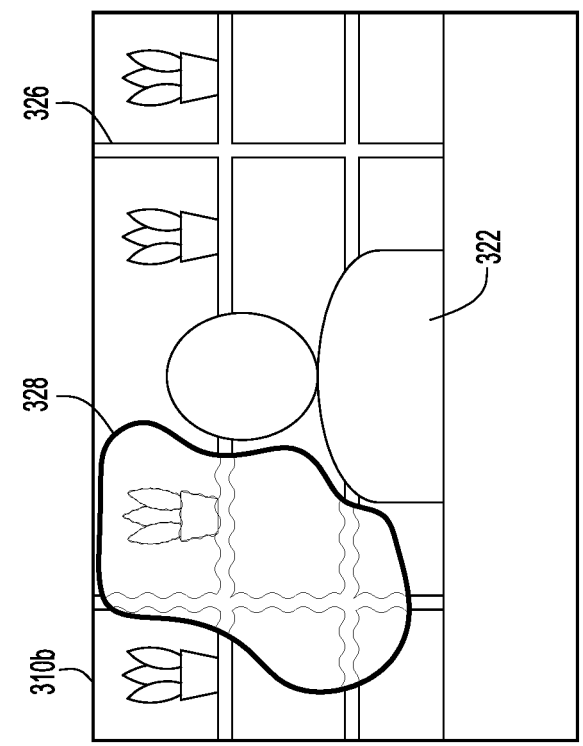
FIG. 3 is a diagram depicting a method for selectively unblurring, in a media stream of a collaboration session, portions of a background identified as part of the participant's zone, according to an example embodiment.
Figure 3:
Figure 3:
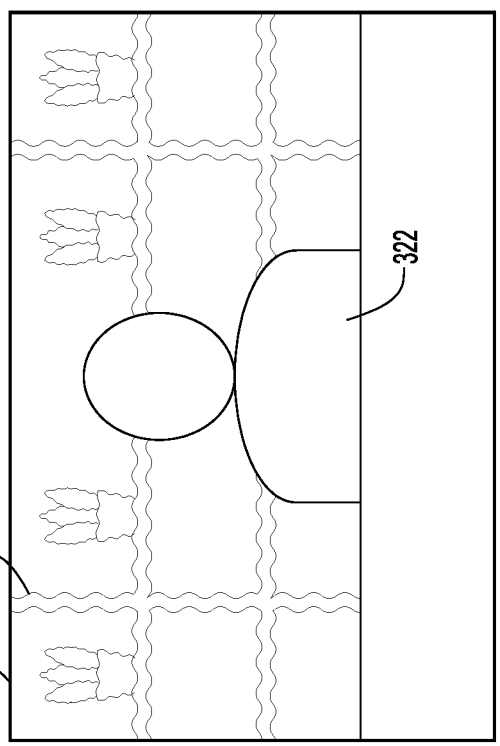

Reference is now made to FIG. 3, with continued reference to FIGS. 1 and 2. FIG. 3 is a diagram depicting a method 300 for selectively unblurring, in a media stream of a collaboration session, portions of a background identified as part of the participant's zone or space, according to an example embodiment. The UPEs 116a-n execute the method 300 for their respective participants.

When a camera is on for a user device, a live video feed is captured and embedded into the media stream of the collaboration session. The live video feed includes one or more frames. Recognition techniques detects the shape of a participant 322 and blur the background 324, as shown in a first frame 310a. Optionally, artificial backgrounds may be used instead of blurring.

In an example embodiment, the UPE is further configured to parse various regions of the one or more frames that are external to the participant 322 i.e., outside the first boundary box 226a of FIG. 2, and detect static objects and other background items therein to learn the space of the participant's collaboration session. The UPE stores learned data about the space or collaboration zone as learned background information.

At 312, based on the UPE detecting that static objects in the space match one of the collaboration zones defined in the learned background information for the participant 322, the identified static objects 326 in the background are unblurred, as shown in a subsequent frame 310b. In particular, the UPE selectively filters the background to show static objects that are identified as part of the collaboration zone of the participant.

In one example embodiment, by studying a subset of consecutive frames in the media stream, the UPE detects one or more moving objects (e.g., a cat). The UPE then filters the first frame 310a to remove elements that are not part of the collaboration zone (not in one or more of learned frames), as shown in a blurred portion 328 of the subsequent frame 310b. Optionally, the blurred portion 328 may be replaced or overlaid with known static objects at that position as defined in the participant zone of the learned background information.

In one example embodiment, the UPE further executes a libration technique (changing perspective or view technique) to detect that the participant's camera 112a is at a different position but is still in the participant zone defined in the learned background information. For example, the participant 322 may move his user device at a different angle, to his desk, to a book on a bookshelf, and so on. The UPE uses the libration technique to identify (previously) known static objects in the participant space and register this changed view as an additional zone and/or as an extension of the participant space. In other words, the learned background information may include one or more of participant zones (office space, home office space, living room space, and so on). Each of the participant zones may further include one or more extensions (background at field of view A, background at field of view B, and so on).

Based on the above, the UPE may detect a change in the participant's space, such as a bookcase being moved to a different location. Specifically, the UPE establishes a comparison between the current field of view and reference images in the learned background information to establish a probability match, and determine if a new background needs to be learned or if a singular object appeared in a known background is now missing. In one example embodiment, the new object is removed from the field of view (blurred or replaced), for example papers, trash, and so on, may be filtered from the table to maintain a clean look of the background. In another example embodiment, the user can select a re-learn option to force the UPE to consider the background as a new normal i.e., to replace the previously stored participant zone and/or field of view (add new furniture piece to the workspace).

In public settings, the background does not match any known participant spaces stored in the learned background information. Therefore, the user surrounding can be blurred. Then, as the collaboration session progresses (over multiple frames) objects that appear to be static are captured and the UPE builds a stable background representation that can then be displayed around the user, still filtering out moving objects (for example, where a new work space is a public coffee shop).

Figure 4:
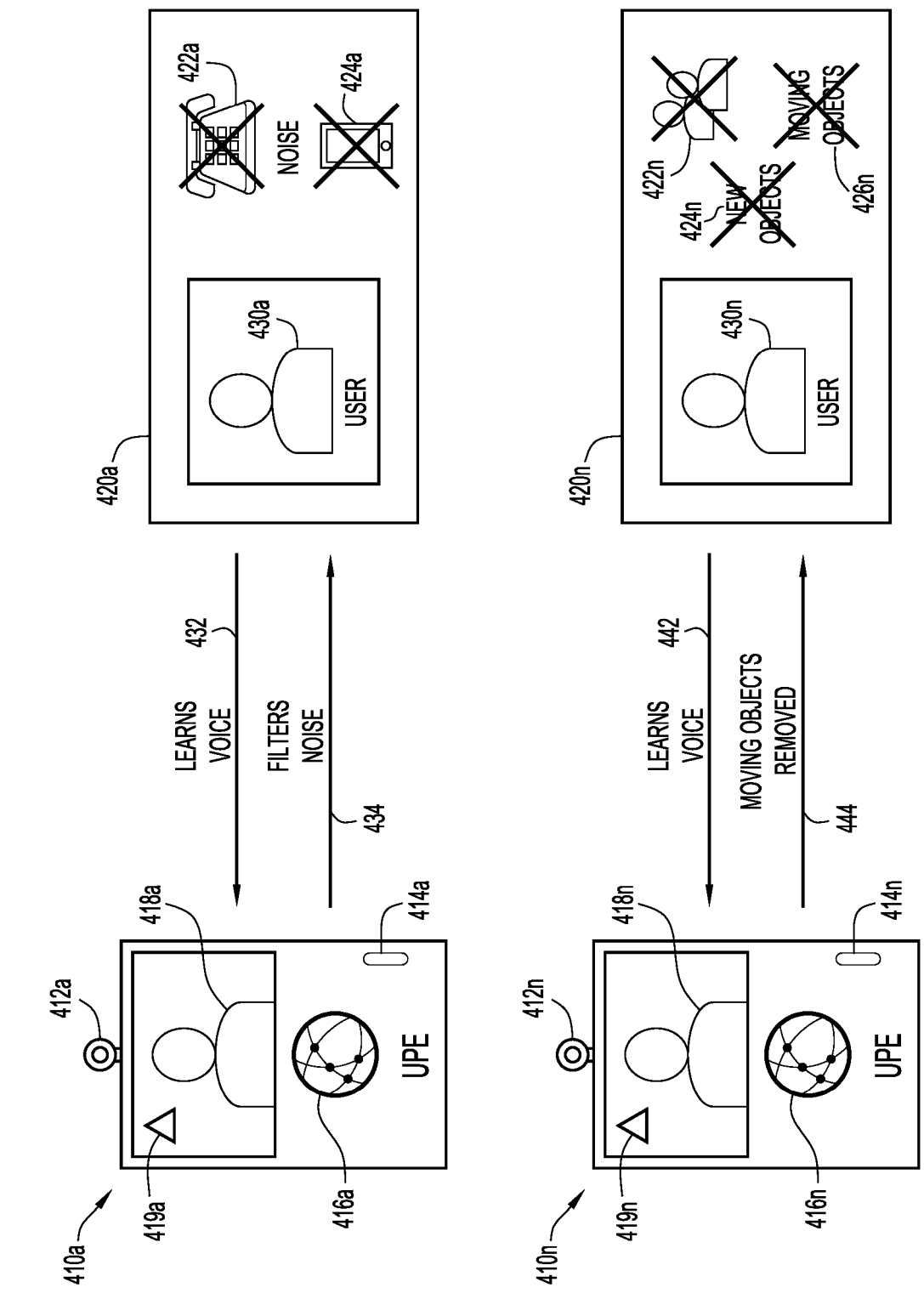
FIG. 4 is a diagram illustrating a system for selectively filtering the media stream of a collaboration session to exclude one or more of an object, a portion part of an audio signal, or a person based on learned background information or voice of the participants of the collaboration session, according to an example embodiment.

Reference is now made to FIG. 4, with continued reference to FIGS. 1-3. FIG. 4 is a diagram illustrating a system 400 for selectively filtering the media stream of a collaboration session to exclude one or more of an object, one or more portions of an audio signal, and/or a person, based on meeting information, learned background information, or a voice of the participants, according to an example embodiment. The system 400 includes user devices 410a-n that produce media streams 420a-n and selectively filtered media streams 430a-n. The user devices 410a-n include respective cameras 412a-n, respective microphones 414a-n, respective UPEs 416a-n, and respective user interface/display screens 418a-n. The UPEs 416a-n run on the respective user devices 410a-n in connection with one or more collaboration tools.

A first participant uses the user device 410a to participate in a collaboration session with the camera 412a being turned off. At 432, the UPE 416a obtains an audio signal that includes user voice, captured by the microphone 414a and included in the media stream 420a. For example, the UPE 416a uses a neural network (e.g. convolutional) to detect re-occurring patterns in the user speech, pitch tone, and phrasing profile. In one example embodiment, the UPE 416a operates without including a database of known sonogram signatures (e.g. noises of non-human speech). The UPE 416a learns the machine default user's speech pattern. For example, a dynamic filter button 419a is made available on the user interface screen 418a in the collaboration session. When the dynamic filter button 419a is activated, the UPE 416a parses the audio captured by the microphone 414a. A simple sigmoid regressor may be used to evaluate if the audio matches the speech pattern of the first participant. The UPE 416a filters out non-matching elements in the audio signal. That is, the regressor only trains on the first participant at the location, and once the UPE 416a learns the voice of the first participant, other audio (noise and other voices) is filtered out. At 434, the other audio from a telephone 422a and noise from a device 424a are excluded in the filtered media stream 430a. The UPE 416a outputs, to the collaboration servers 120a-n of FIG. 1, the filtered media stream 430a that includes speech segment(s) of the first participants and excludes all other audio portions. This overcomes the problem of having an exhaustive training set used to identify and filter background sounds.

In the system 400, a second participant uses the user device 410n to participate in the collaboration session and turns on the camera 412n. The media stream 420n is captured using the camera 412n and the microphone 414n and includes audio and video.

At 442, the UPE 416n (in addition to obtaining the user voice characteristics as in the operation 432, by enabling dynamic filter button 419n on the user interface screen 418n) detects patterns in one or more video frames. In a setting where the second participant works from home (usually from the same location) or in the office (usually from the same desk), the UPE 416n learns typical non-moving objects (static objects) in the video frames (background) to generate learned background information. The learned background information includes a first set of static objects with their respective locations (e.g., x, y, z coordinates) in the home location and a second set of static objects with their respective locations in the office location. The UPE 416n further performs facial recognition to learn the second participant's facial characteristics. Facial characteristics together with typical user speech characteristics form learned user information.

Based on the learned user and background information, at 444, the UPE 416n generates filtered media stream 430n. The filtered media stream 430n excludes other participants 422n (inadvertent participants described in FIG. 2), any new object 424n (that is not identified as a static object of the participant space described in FIG. 3). For example, items on the desk such as papers, pens, food, and so on are removed in the media stream 420n. Moreover, moving objects 426n such as a cat or a flying ball are also removed in the filtered media stream 430n. The filtered media stream 430n also excludes audio other than the second participant's speech (described above in connection with operation 434).

Figure 5:
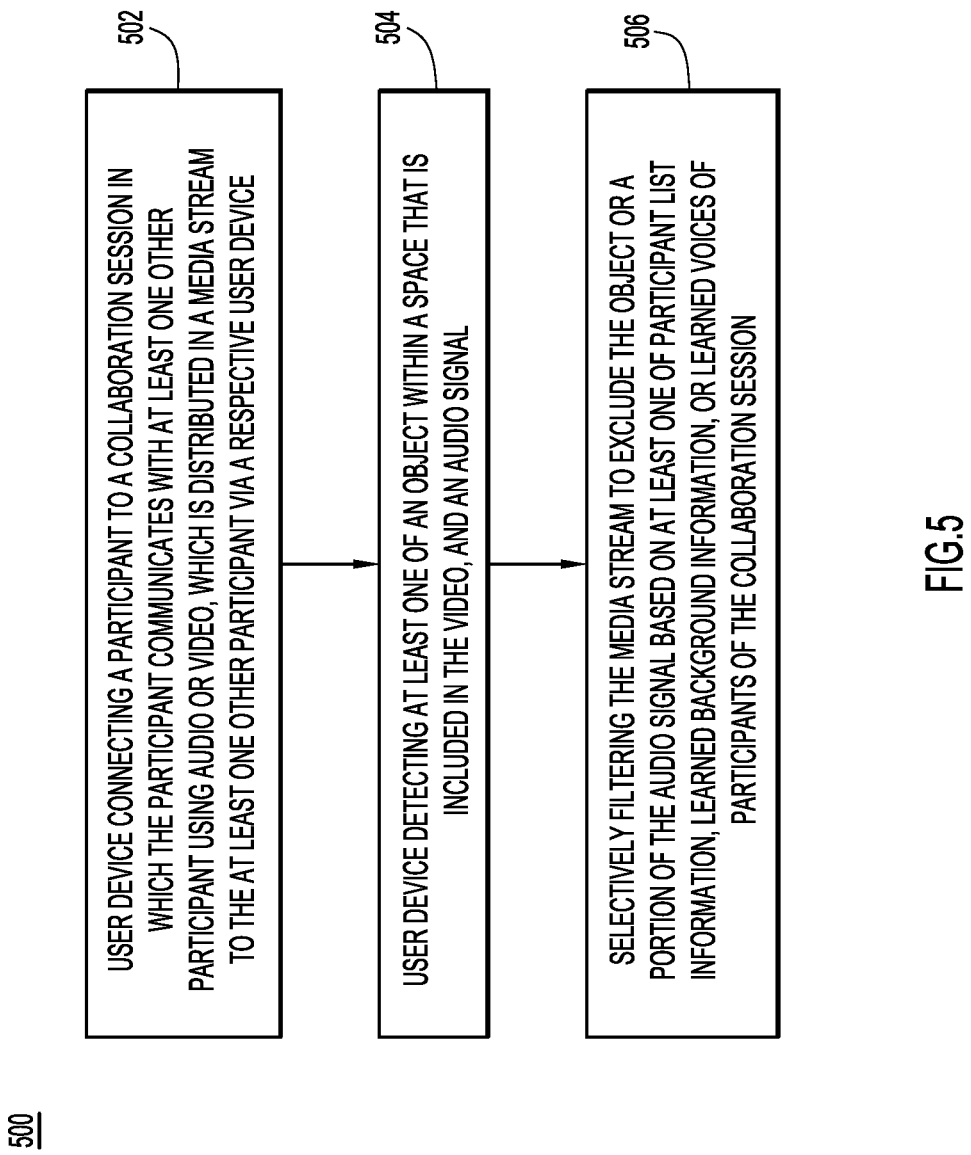
FIG. 5 is a flowchart illustrating a method for selecting filtering the media stream of a collaboration session based on one or more of participant list information, learned background information, or learned voices of the participants, according to an example embodiment.

Reference is now made to FIG. 5, with continued reference to FIGS. 1-4. FIG. 5 is a flow chart illustrating a method 500 of selectively filtering the media stream of a collaboration session based on one or more of participant list information, learned background information, or learned voices of the participants, according to an example embodiment. The method 500 may be implemented by a computing device such as one of the devices 110a-n of FIG. 1 and/or one of the collaboration servers 120a-n of FIG. 1, and/or one of the user devices 410a-n of FIG. 4. For example, one of the UPEs 116a-n may implement the method 500 with an aide of one of the collaboration servers 120a-n.

At 502, the method 500 involves a user device connecting a participant to a collaboration session in which the participant communicates with at least one other participant using audio and/or video, which is distributed in a media stream to the at least one other participant via a respective user device.

At 504, the method 500 involves the user device detecting at least one of an object within a space that is included in the video, and an audio signal.

At 506, the method 500 involves selectively filtering the media stream to exclude the object or a portion of the audio signal based on at least one of participant list information, learned background information, or learned voices of participants of the collaboration session.

In the method 500, the object may be a person. The operation 506 of selectively filtering the media stream may include determining whether the person is one of the participants in the collaboration session using the participant list information and removing or blurring the person from the space in the media stream based on determining that the person is not one of the participants.

In one form, the operation of determining whether the person is one of the participants may include extracting first facial feature data of the person from the media stream using a facial recognition technique and comparing the first facial feature data of the person with the participant list information which includes second facial feature data for each of the participants. The operation of determining whether the person is one of the participants may further include, based on comparing finding a match between the first facial feature data of the person and the second facial feature data for each of the participants in the participant list information, determining that the person is one of the participants in the collaboration session.

In one or more example embodiments, the operation of removing or blurring the person may include generating a boundary box around an image portion that includes the person in the media stream using a segmentation technique and blurring or removing only pixel data inside the boundary box in the media stream.

In one instance, the operation of blurring or removing the pixel data may include replacing the pixel data based on the learned background information.

In the method 500, the object may be a static object or a moving object newly detected in the space. The operation 506 of selectively filtering the media stream may include removing image data for the object from the media stream based on the learned background information that includes static objects identified as part of a background of the collaboration session.

In another form, the operation 504 of detecting may include detecting the audio signal in the media stream. The operation 506 of selectively filtering the media stream may include filtering the audio signal to exclude audio other than voice audio of the participant based on the learned voices of the participants.

In one or more example embodiments, the method 500 may further involve learning signatures associated with voice audio of the participants during the collaboration session.

In one instance, the method 500 may further involve the user device blurring, in the media stream, background of the participant at a start of the collaboration session and detecting static objects of the background in one or more frames of the media stream. The method 500 may also involve determining whether the static objects identify a participant zone of the learned background information and, based on the static objects identifying the participant zone, unblurring a set of the static objects identified as part of the participant zone while removing other objects detected in the space.

FIG. 6 is a hardware block diagram of a computing device 600 that may perform functions associated with any combination of operations in connection with the techniques depicted in FIGS. 1-5, according to various example embodiments, including, but not limited to, operations of one or more of devices 110*a-n* of FIG. 1, one or more of the collaboration servers 120*a-n* of FIG. 1, or one of the user devices 410*a-n* of FIG. 4. It should be appreciated that FIG. 6 provides only an illustration of one embodiment and does not imply any limitations with regard to the environments in which different embodiments may be implemented. Many modifications to the depicted environment may be made.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with one or more memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 616 (a display screen or a computer monitor), or the like. The external devices may further include a camera 618 and/or a microphone 619.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as one of the devices 110*a-n* of FIG. 1, one of the collaboration servers 120*a-n* of FIG. 1, or one of the user devices 410*a-n* of FIG. 4. The apparatus includes a memory, a network interface configured to enable network communications and a processor. The processor is configured to perform various operations. The operations include connecting a participant to a collaboration session in which the participant communicates with at least one other participant using audio and/or video, which is distributed in a media stream to the at least one other participant via a respective user device. The operations further include detecting at least one of an object within a space that is included in the video, and an audio signal and selectively filtering the media stream to exclude the object or a portion of the audio signal based on at least one of participant list information, learned background information, or learned voices of participants of the collaboration session.

According to one or more example embodiments, the object may be a person. Additionally, the processor may be configured to perform the operation of selectively filtering the media stream by determining whether the person is one of the participants in the collaboration session using the participant list information and removing or blurring the person from the space in the media stream based on determining that the person is not one of the participants.

In one form, the processors may be configured to perform the operation of determining whether the person is one of the participants by extracting first facial feature data of the person from the media stream using a facial recognition technique and comparing the first facial feature data of the person with the participant list information which includes second facial feature data for each of the participants. The processor may further be configured to determine whether the person is one of the participants by, based on the comparing finding a match between the first facial feature data of the person and the second facial feature data for each of the participants in the participant list information, determining that the person is one of the participants in the collaboration session.

In one instance, the processor may be configured to perform the operation of removing or blurring the person by generating a boundary box around an image portion that includes the person in the media stream using a segmentation technique and by blurring or removing only pixel data inside the boundary box in the media stream.

According to one or more example embodiment, the processor may be configured to perform the operation of removing or blurring the pixel data by replacing the pixel data based on the learned background information.

In another form, the object may be a static object or a moving object newly detected in the space. The processor may be configured to perform the operation of selectively filtering the media stream by removing image data for the object from the media stream based on the learned background information that includes static objects identified as part of a background of the collaboration session.

In yet another form, the processor may be configured to perform the operation of detecting by detecting the audio signal in the media stream. The processor may then be configured to perform the operation of selectively filtering the media stream by filtering the audio signal to exclude one or more audio other than voice audio of the participant based on the learned voices of the participants.

In yet another example embodiment, one or more non-transitory computer readable storage media encoded with instructions are provided. When the media is executed by a processor, the instructions cause the processor to execute a method involving connecting a participant to a collaboration session in which the participant communicates with at least one other participant using audio and/or video, which is distributed in a media stream to the at least one other participant via a respective user device and detecting at least one of an object within a space that is included in the video and an audio signal. The method may further involve selectively filtering the media stream to exclude the object or a portion of the audio signal based on at least one of participant list information, learned background information, or learned voices of participants of the collaboration session.

In yet another example embodiment, a system is provided that includes the devices and operations explained above with reference to FIGS. 1-6.

The programs described herein (e.g., control logic 620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 606 and/or memory elements(s) 604 can store data, software, code, instructions (e.g., processor instructions), logic, parameters, combinations thereof, and/or the like used for operations described herein. This includes the storage 606 and/or memory elements(s) 604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    connecting, by a user device, a participant to a collaboration session in which the participant communicates with at least one other participant using video which is distributed in a media stream to the at least one other participant via a respective user device;
    detecting, by the user device, an object within a space that is included in the video;
    determining whether the object is a person that is included in participant list information; and
    selectively filtering the media stream to exclude the object based on the participant list information by removing or blurring the person determined to be an inadvertent participant that is not included in the participant list information.

2. The method of claim 1, wherein determining whether the person is one of participants includes:
    extracting first facial feature data of the person from the media stream using a facial recognition technique;
    comparing the first facial feature data of the person with the participant list information which includes second facial feature data for each of the participants; and
    based on comparing finding a match between the first facial feature data of the person and the second facial feature data for each of the participants in the participant list information, determining that the person is one of the participants in the collaboration session.

3. The method of claim 1, wherein removing or blurring the person includes:
    generating a boundary box around an image portion that includes the person in the media stream using a segmentation technique; and
    blurring or removing only pixel data inside the boundary box in the media stream.

4. The method of claim 3, where blurring or removing the pixel data includes:
    replacing the pixel data based on learned background information.

5. The method of claim 1, wherein the object is a static object or a moving object newly detected in the space, and selectively filtering the media stream includes:
    removing image data of the object from the media stream based on learned background information that includes static objects identified as part of a background of the collaboration session.

6. The method of claim 1, further comprising:
    detecting an audio signal in the media stream, wherein selectively filtering the media stream further includes filtering the audio signal to exclude one or more audio other than voice audio of the participant based on learned voices of participants.

7. The method of claim 6, further comprising learning signatures associated with voice audio of the participants during the collaboration session.

8. The method of claim 1, further comprising:
    blurring, by the user device, in the media stream, background of the participant at a start of the collaboration session;
    detecting static objects of the background in one or more frames of the media stream during the collaboration session;
    determining whether the static objects identify a participant zone of learned background information; and
    based on the static objects identifying the participant zone, unblurring a set of the static objects identified as part of the participant zone while removing other objects detected in the space.

9. The method of claim 1, wherein the object is a moving object within the space and selectively filtering the media stream includes:
    removing image data of the moving object from the media stream based on learned background information that includes static objects identified as part of a background of the collaboration session.

10. The method of claim 1, further comprising:
    detecting one or more static objects in the space of the participant;
    determining whether the one or more static objects match one of a plurality of collaboration zones defined in learned background information for the participant; and unblurring the one or more static objects based on determining a match with the one of the plurality of collaboration zones.

11. The method of claim 1, further comprising:
detecting a change in the space of the participant;
determining a probability match based on reference images in learned background information; and
learning new background information based on the probability match.

12. An apparatus comprising:
a memory;
a network interface configured to enable network communications; and
a processor, wherein the processor is configured to perform operations comprising:
connecting a participant to a collaboration session in which the participant communicates with at least one other participant using video, which is distributed in a media stream to the at least one other participant via a respective user device;
detecting an object within a space that is included in the video;
determining whether the object is a person that is included in participant list information; and
selectively filtering the media stream to exclude the object based on the participant list information by removing or blurring the person determined to be an inadvertent participant that is not included in the participant list information.

13. The apparatus of claim 12, wherein the processor is configured to perform the operation of determining whether the person is one of participants by:
extracting first facial feature data of the person from the media stream using a facial recognition technique;
comparing the first facial feature data of the person with the participant list information which includes second facial feature data for each of the participants; and
based on comparing finding a match between the first facial feature data of the person and the second facial feature data for each of the participants in the participant list information, determining that the person is one of the participants in the collaboration session.

14. The apparatus of claim 12, wherein the processor is configured to perform the operation of removing or blurring the person by:
generating a boundary box around an image portion that includes the person in the media stream using a segmentation technique; and
blurring or removing only pixel data inside the boundary box in the media stream.

15. The apparatus of claim 14, where the processor is configured to perform the operation of removing or blurring the pixel data by:
replacing the pixel data based on learned background information.

16. The apparatus of claim 12, wherein the object is a static object or a moving object newly detected in the space, and the processor is configured to perform the operation of selectively filtering the media stream by:
removing image data of the object from the media stream based on learned background information that includes static objects identified as part of a background of the collaboration session.

17. The apparatus of claim 12, wherein the processor is further configured to perform:
detecting an audio signal in the media stream, wherein the processor is configured to perform the operation of selectively filtering the media stream further by filtering the audio signal to exclude one or more audio other than voice audio of the participant based on learned voices of participants.

18. One or more non-transitory computer readable storage media encoded with instructions that, when executed by a processor, cause the processor to execute a method comprising:
connecting a participant to a collaboration session in which the participant communicates with at least one other participant using video, which is distributed in a media stream to the at least one other participant via a respective user device;
detecting an object within a space that is included in the video;
determining whether the object is a person that is included in participant list information; and
selectively filtering the media stream to exclude the object based on the participant list information by removing or blurring the person determined to be an inadvertent participant that is not included in the participant list information.

19. The one or more non-transitory computer readable storage media of claim 18, wherein determining whether the person is one of participants includes:
extracting first facial feature data of the person from the media stream using a facial recognition technique;
comparing the first facial feature data of the person with the participant list information which includes second facial feature data for each of the participants; and
based on comparing finding a match between the first facial feature data of the person and the second facial feature data for each of the participants in the participant list information, determining that the person is one of the participants in the collaboration session.

20. The one or more non-transitory computer readable storage media of claim 18, wherein removing or blurring the person includes:
generating a boundary box around an image portion that includes the person in the media stream using a segmentation technique; and
blurring or removing only pixel data inside the boundary box in the media stream.

* * * * *